United States Patent [19]

Rankins et al.

[11] 4,179,771
[45] Dec. 25, 1979

[54] KNOB

[75] Inventors: Paul Rankins; Robert K. Howie, Jr., both of Decatur, Ill.

[73] Assignee: The Grigoleit Company, Decatur, Ill.

[21] Appl. No.: 885,681

[22] Filed: Mar. 13, 1978

[51] Int. Cl.² .................................................. F16D 1/06
[52] U.S. Cl. ..................................... 16/121; 292/349; 403/361
[58] Field of Search .................. 16/121, 118; 292/349, 292/352, 353; 74/553; 403/361, 354, 345, 289

[56] References Cited
U.S. PATENT DOCUMENTS

| | | | |
|---|---|---|---|
| 1,938,556 | 12/1933 | Danielson | 403/361 X |
| 2,283,905 | 5/1942 | Beal | 16/118 X |
| 2,291,560 | 7/1942 | Rhodes | 403/361 X |
| 3,188,124 | 6/1965 | Pestka et al. | 292/349 X |
| 3,679,252 | 7/1972 | Howie | 292/349 |
| 3,880,534 | 4/1975 | Schmidt | 16/121 X |
| 3,880,536 | 4/1975 | Petrus | 74/553 X |
| 3,965,529 | 6/1976 | Hadzimahalis | 403/361 X |
| 3,994,608 | 11/1976 | Swiderski et al. | 292/349 X |

*Primary Examiner*—George H. Krizmanich
*Attorney, Agent, or Firm*—Kinzer, Plyer, Dorn & McEachran

[57] ABSTRACT

A molded knob of the type which frictionally engages and slips over the end of a shaft. The knob has a hub with a shaft receiving socket formed therein. The socket has a flat wall adapted to engage a flat on the shaft. Elongated fingers which are formed as part of the hub extend into the socket on the opposite side of the socket from the flat wall. The fingers extend towards and are aligned with each other. They are laterally deflectable away from the flat wall of the socket upon insertion of the shaft into the socket. An abutment is located at the base of each finger. One of the abutments is engageable with the shaft when the shaft is rotated to limit further deflection of the fingers by the shaft due to twisting caused by the application of torque to the shaft. In a modified form, a stop is provided to engage the fingers to limit the amount of deflection of the fingers in place of the abutments.

5 Claims, 9 Drawing Figures

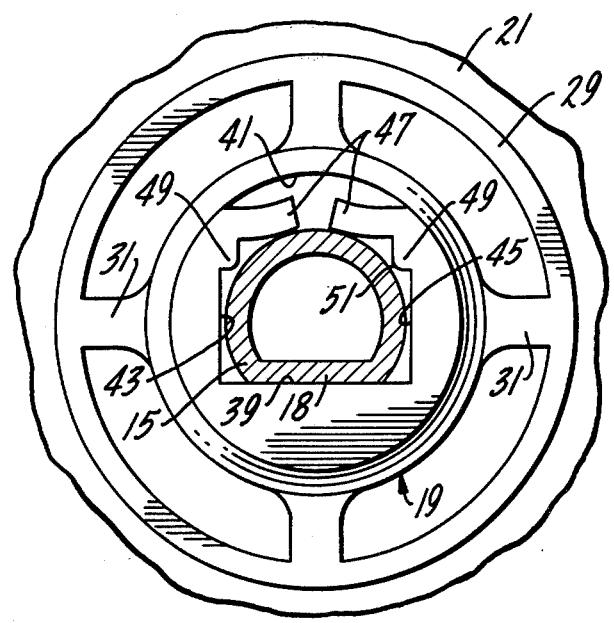

KNOB

BACKGROUND AND SUMMARY OF THE INVENTION

The molded plastic knob of this invention is an improvement to the friction fit knob shown and described in U.S. Pat. No. 3,679,252 of Robert K. Howie, Jr., which is assigned to the same assignee as this application. Knobs of the type shown in the Robert K. Howie, Jr. patent have generally functioned satisfactorily in use. However, problems have arisen when relatively high torques, for example, of the magnitude of 20 in. lbs. have been applied to the knob. The application of this high torque has, in some instances, resulted in a permanent set or distortion of the resilient fingers which exert the holding force between the knob and the shaft. This has resulted in separation of the knob from the shaft.

Therefore, an object of this invention is a friction fit knob that will maintain a secure friction fit on a shaft even when subjected to high torque conditions.

Another object of this invention is a knob which is relatively simple and inexpensive to mold.

Other objects may be found in the following specification, claims and drawings.

BRIEF DESCRIPTION OF THE DRAWINGS

The invention is illustrated more or less diagrammatically in the following drawings wherein;

FIG. 4A is a view similar to FIG. 4 but showing the shaft inserted in the socket which is dimensioned so that the rounded corners of the abutments are just spaced from the shaft section.

DESCRIPTION OF THE PREFERRED EMBODIMENTS

Figure 1:
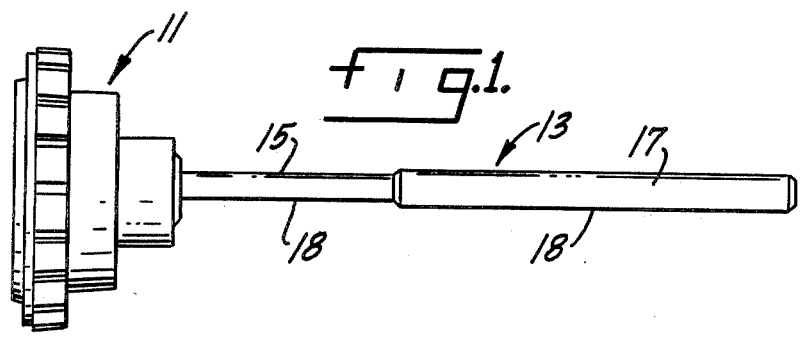
FIG. 1 is a side elevational view of a knob of this invention mounted on a hollow shaft.

FIG. 1 of the drawings shows a molded knob 11 embodying the novel features of this invention mounted on a hollow tubular shaft 13. As shown in the drawings, the shaft may be made in two sections, 15 and 17, one of which telescopes into the other. The shaft sections are customarily made of a metal and can be constructed of generally circular cross section with a flat side 18. The hollow tubular shaft is only one example of the many types of shafts which can be accomodated by the molded knob of this invention. It should also be understood that the shafts which can be used with the knobs of this invention can be formed as an integral part of the device they operate such as a switch or a valve or the like.

Figures 2, 3:
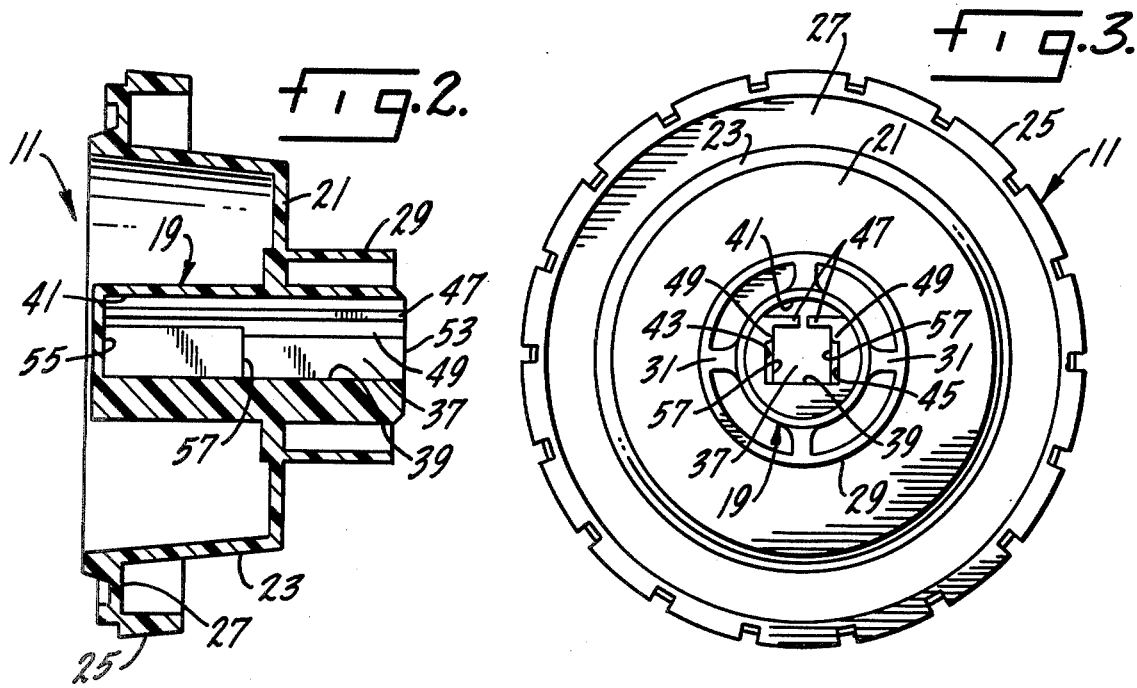
FIG. 2 is an enlarged longitudinal cross sectional view taken through the knob of FIG. 1.
FIG. 3 is a rear elevational view of the knob of FIG. 2.

A knob 11 may be molded from a thermoplastic material such as nylon. The knob includes a hub 19. Integrally connected to the hub 19 is a radially extending wall 21. A sloping cylindrical wall 23 is integrally attached to the radial wall 21. An outer flange 25 is connected to the cylindrical wall 23 by a radially extending annular wall 27. The portion of the hub 19 which is located rearwardly, that is to the right, as viewed in FIGS. 1 and 2, of the radial wall 21 is surrounded by a cylindrical wall 29. Radial ribs 31 connect the cylindrical wall 29 and the hub 19.

The hub 19, which is generally cylindrical in shape, has a shaft receiving socket 37 formed therein. The socket, which is of generally rectangular transverse cross section, has oppositely facing walls 39, 41 and 43, 45. Extending out of the opposed walls 43 and 45 and projecting towards each other are generally identical fingers 47. The fingers are of generally rectangular cross section, are aligned with each other and terminate short of each other. An abutment 49 is formed integrally at the base of each finger. Each abutment contacts a wall 43 or 45 and a finger 47. Each abutment has a dimension extending along the length of its finger which is less than its dimension which extends at right angles to its finger. A rounded corner 51 is formed on each abutment and this corner faces the shaft section 15 which is inserted in the socket 37.

The fingers 47 extend longitudinally from the entrance 53 of the socket to the bottom thereof where they merge with the bottom wall 55 of the socket. Shaft engaging stops 57 are formed in the socket between the entrance opening 53 and the bottom wall 55 to limit the depth to which the shaft can be inserted in the socket.

Figure 6:
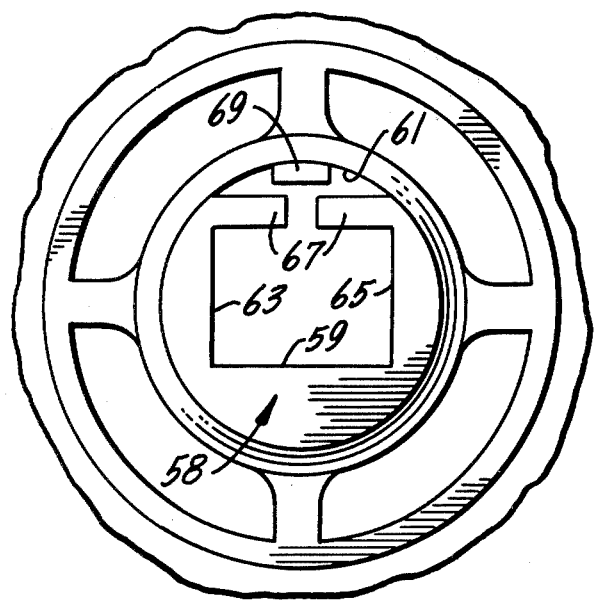
FIG. 6 is an enlarged, partial, rear elevational view of a modified form of knob.
Figure 7:
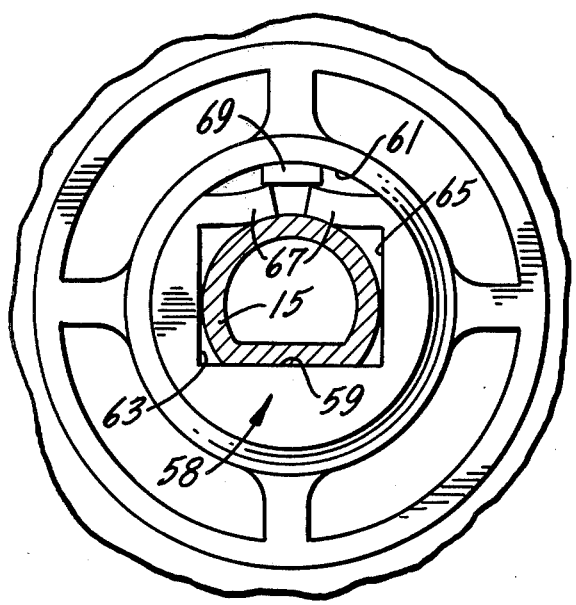
FIG. 7 is an enlarged, partial, rear elevational view of the knob of FIG. 6 showing a shaft inserted in the socket with the deflection of the fingers of the knob exaggerated for clarity of illustration.
Figure 8:
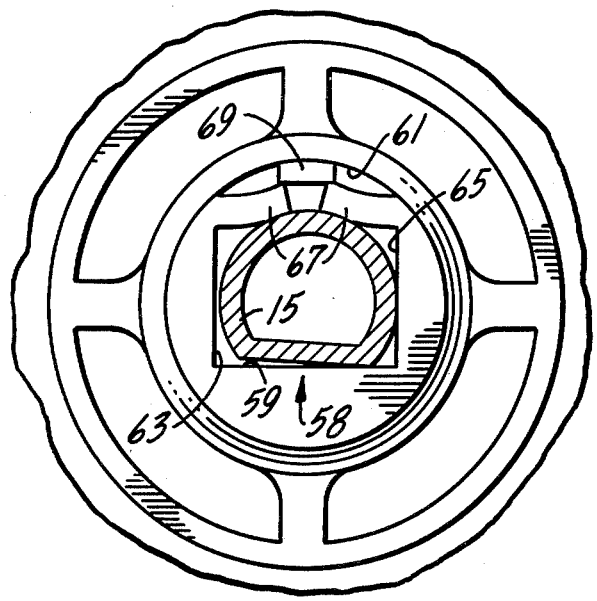
FIG. 8 is a view similar to FIG. 7 but showing the position of the shaft and the deflection of the fingers when torque is applied to the shaft with the rotation of the shaft and deflection of the fingers exaggerated for clarity of illustration.

A knob having a modified shaft receiving socket 58 is shown in FIGS. 6, 7 and 8 of the drawings. This socket, which is of generally rectangular transverse cross section, has oppositely facing walls 59, 61 and 63, 65. Extending out of the opposed walls 63, 65 and projecting towards each other are generally identical fingers 67.

The fingers are of generally rectangular cross section, are aligned with each other and terminate short of each other. The fingers extend longitudinally from the entrance of the socket (not shown) to the bottom thereof where they merge with the bottom wall (not shown) of the socket. Shaft engaging stops similar to stops 57 are formed in the socket. A stop 69 is formed integrally on the wall 61 of the socket and extends towards and overlaps the ends of the fingers 67.

Figure 4:
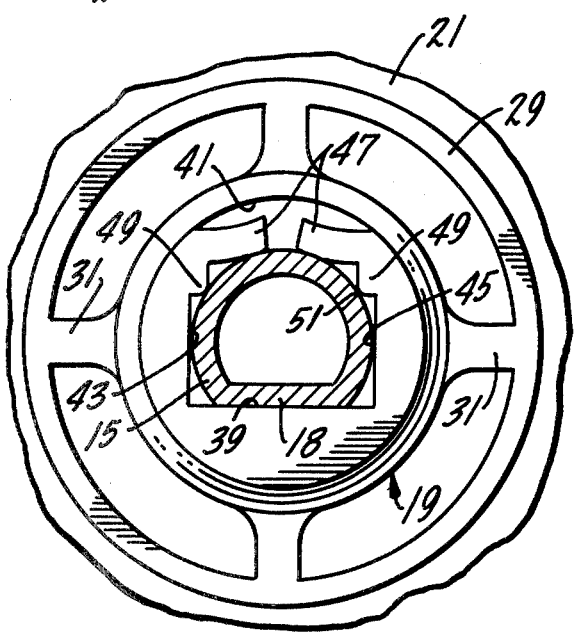
FIG. 4 is an enlarged partial rear elevational view of the knob and shaft of FIG. 1 showing the shaft inserted into the socket with the deflection of the fingers of the knob exaggerated for clarity of illustration.

The use, operation and function of this invention are as follows:

When a shaft such as the shaft 13 is inserted into the socket 37 of the knob 11, it must be positioned with its flat wall 18 of the shaft section 15 in contact with the flat wall 39 of the socket as shown in FIG. 4. Because of the dimensioning of the socket and the shaft section 15, the shaft can only be inserted when oriented in this manner. Upon insertion of the shaft section 15 in the socket, the fingers 47 of the hub 19 are bent radially outwardly and away from the flat wall 39 located opposite to them. The inherent resilience and flexibility of the fingers will exert sufficient force on the shaft section 15 to hold it securely in position. The socket cross section and the shaft section 15 are dimensioned to provide a slip fit for the shaft section 15. Usually, the only contact between the shaft section 15 and the socket is along the wall 18 of the shaft section and with the fingers 47. The abutments 49 are dimensioned so that their rounded corners 51 are just spaced from or barely touch the shaft section 15 when it is inserted into the socket.

Figure 5:
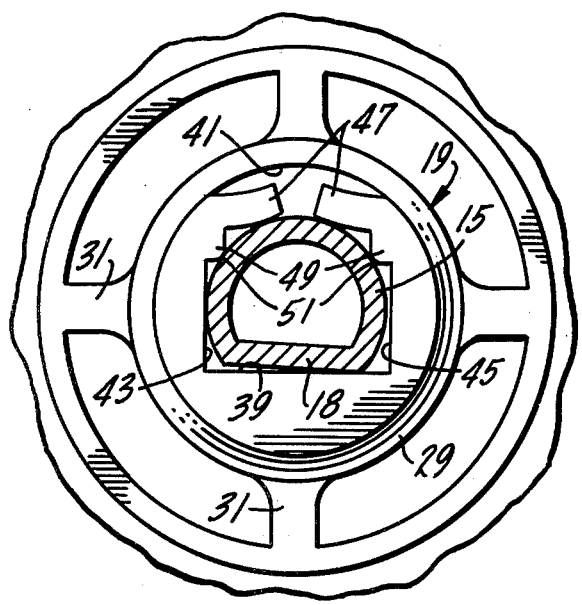
FIG. 5 is a view similar to FIG. 4 but showing the position of the shaft and the deflection of the fingers when torque is applied to the shaft with the rotation of the shaft and deflection of the fingers exaggerated for clarity of illustration.

When torque is applied to the shaft 13, for example in a clockwise direction, as viewed in the drawings of FIGS. 4 and 5, the shaft section 15 will be rocked slightly so as to move a portion of its flat wall 18 out of contact with the flat wall 39 of the socket in the manner shown in FIG. 5. This rocking or tilting of the shaft will cause additional outward distortion of the fingers 47. However, it will also bring the shaft section 15 into contact with the corner 51 of the left hand abutment 49 thereby transferring most of the torque to the abutment. The absorption of the torque by the abutment prevents further distortion of the fingers 47 and prevents excess distortion thereof which might cause a permanent set of the fingers in their distorted condition.

Flexibility of the fingers 47 is obtained even though they are connected to the bottom wall 55 of the socket by molding the fingers so that they extend into the socket beyond the area of contact of the fingers with the shaft 13. This is accomplished through the provision of stops 57 which limit the depth of insertion of the shaft into the socket 37. This feature provides flexibility without requiring the end of the fingers at the bottom of the socket to be spaced from the bottom wall 55. Consequently, the construction of the core pin which is used to mold the socket portion of the knob is greatly simplified.

A knob having a modified shaft receiving socket 58 receives a shaft such as the shaft 13 in essentially the same manner as previously described for the first embodiment of the invention having a socket 37. Upon insertion of a shaft section 15, or a similar section of a compatible shaft, in the socket, the fingers 67 of the hub are bent radially outwardly and away from the flat wall 59 located opposite to them in the manner shown in FIG. 7. The outwardly bending of the fingers is limited by the engagement of the ends of the fingers with the stop 69 formed integrally as part of the wall 61 of the socket. If the ends of the fingers are not bent into engagement with the stop when the shaft is inserted in the socket, they will engage the stop when torque is applied to the shaft. The application of torque to the shaft may cause it to rock or tilt slightly thus causing additional outwardly distortion of the fingers. However, the contact between the ends of the fingers and the stop will effectively limit distortion of the fingers thereby preventing excess distortion which might cause a permanent set of the fingers in their distorted condition.

Whereas the preferred forms of the invention have been shown and described, it should be understood that there are many modifications, substitutions and alterations which may be made without departing from the fundamental theme of the invention. Therefore, the scope of the invention should be limited only by a liberal interpretation of the following claims.

We claim:

1. A molded knob of the type which frictionally engages and slips over the end of a shaft,
   a hub formed as part of said knob,
   a shaft receiving socket formed in said hub,
   said socket having a flat wall adapted to engage a flat on said shaft,
   elongated fingers formed as part of said hub and extending into said socket on the opposite side of said socket from said flat wall,
   said fingers extending towards and in alignment with each other and being laterally deflectable in a direction away from said flat wall upon insertion of said shaft into said socket, and
   at least one abutment formed as part of said hub and adapted to limit further deflection of said fingers beyond that caused by the insertion of said shaft into said socket, specifically when said further deflection is due to the application of torque to the shaft.

2. The molded knob of claim 1 in which an abutment is located at the base of each finger, and
   one of said abutments is engageable with said shaft when the shaft is rotated to thereby limit further deflection of said fingers by said shaft due to twisting caused by the application of torque to the shaft.

3. The hub of claim 2 in which each of said abutments have a dimension extending along the length of its finger which is less than its dimension which extends at right angles to its finger.

4. The hub of claim 2 in which said abutments are spaced from the shaft except when torque is being applied to the shaft.

5. The knob of claim 1 in which said abutment is positioned radially outwardly of the fingers at their ends and is positioned to be engaged by the fingers when they are further deflected by the shaft due to twisting caused by the application of torque to the shaft.

* * * * *